(12) United States Patent
Yousey

(10) Patent No.: US 11,788,890 B2
(45) Date of Patent: Oct. 17, 2023

(54) ON-PREMISES CALIBRATOR SYSTEM FOR OPTICAL MODULES

(71) Applicant: Custom Calibration Solutions, LLC, Hamilton, NJ (US)

(72) Inventor: Randy Yousey, Flemington, NJ (US)

(*) Notice: Subject to any disclaimer, the term of this patent is extended or adjusted under 35 U.S.C. 154(b) by 0 days.

(21) Appl. No.: 17/752,206

(22) Filed: May 24, 2022

(65) Prior Publication Data

US 2022/0373390 A1 Nov. 24, 2022

Related U.S. Application Data

(60) Provisional application No. 63/192,148, filed on May 24, 2021.

(51) Int. Cl.
*G01J 3/02* (2006.01)
*G01J 3/28* (2006.01)

(52) U.S. Cl.
CPC ......... *G01J 3/28* (2013.01); *G01J 2003/283* (2013.01); *G01J 2003/2879* (2013.01)

(58) Field of Classification Search
CPC ....... G01B 5/28; G01J 3/28; G01J 3/02; G01J 2003/283; G01J 2003/2879; G01J 3/00; G01J 3/10

See application file for complete search history.

(56) References Cited

U.S. PATENT DOCUMENTS

| | | |
|---|---|---|
| 6,362,878 B1 | 3/2002 | Wang et al. |
| 6,507,013 B2 | 1/2003 | Loecklin |
| 6,573,990 B1 | 6/2003 | Anderson |
| 6,580,531 B1 | 6/2003 | Swanson et al. |
| 6,590,644 B1 | 7/2003 | Coin et al. |
| 6,614,527 B2 | 9/2003 | Fuhrmann et al. |
| 7,864,330 B2 | 1/2011 | Kawanishi et al. |
| 9,935,715 B2 | 4/2018 | Duthel |
| 10,247,605 B2 | 4/2019 | Chalmers |
| 10,859,440 B2 | 12/2020 | Chen et al. |
| 2005/0073674 A1 | 4/2005 | French et al. |

(Continued)

OTHER PUBLICATIONS

Terra, Osama, et al., "Calibration of Grating Based Optical Spectrum Analyzers", Journal of Optics, Oct.-Dec. 2015, vol. 44, No. 4, pp. 366-372.

*Primary Examiner* — Abdullahi Nur
(74) *Attorney, Agent, or Firm* — Wendy W. Koba

(57) ABSTRACT

An optical wavelength calibrator is configured to be used on premises with instrumentation such as an optical spectrum analyzer. The on-premises calibrator includes both a fixed wavelength source and a tunable wavelength source, with a variable optical attenuator controlling the power level of a calibration beam provided as an output. A controller within the on-premises calibrator is used to generate the control signals for the various components in response to received external commands, typically via from an external GUI of the user's computer system. The controller is used in combination with the tunable wavelength source to provide a series of output calibration signals at different wavelengths, providing the ability to performance calibration across a desired spectral region and not just a single wavelength. The on-premises calibrator maintains real-time wavelength stability of the instrument to minimize down time when compared off-site extensive re-calibration services.

10 Claims, 5 Drawing Sheets

(56) References Cited

U.S. PATENT DOCUMENTS

2005/0265717 A1 12/2005 Zhou
2006/0095216 A1 5/2006 Reintjes et al.
2017/0122874 A1* 5/2017 Alon ..................... G01J 3/4412

* cited by examiner

ON-PREMISES CALIBRATOR SYSTEM FOR OPTICAL MODULES

CROSS-REFERENCE TO RELATED APPLICATIONS

This application claims the benefit of U.S. Provisional Application No. 63/192,148, filed May 24, 2021 and herein incorporated by reference.

TECHNICAL FIELD

The present invention relates to optical systems that perform wavelength-based measurements such as optical spectrum analyzers.

BACKGROUND OF THE INVENTION

Optical instruments such as optical spectrum analyzers (OSAs) are used to measure received optical power as a function of wavelength. Typical OSAs need to perform over a relatively wide range, with the ability to define a set of wavelengths with a high level of precision (e.g., five or more significant figures) and an accuracy of the power measurements with a high degree of confidence and repeatability.

To verify the accuracy of these measurements, instrument calibration is necessary. Prior techniques involve calibrating the device of interest using a single wavelength standard, such as a calibrated "golden" source. While calibration at a single point, measurement accuracy over a wider range can only be implied or estimated. In particular, single point calibration ensures measurement accuracy at and near that single point, measurement accuracy over a wider wavelength range can only be implied or estimated. In particular, single point calibration does not correct for any errors in the linearity of the optical instrument over a wide wavelength range.

Calibration is performed once during manufacture of an OSA (or similar equipment), followed by periodic re-calibration at an equipment manufacturing/maintenance company location. The need to take an OSA out of service and sent away to be re-calibrated is not an optimum solution and is often not a practical approach. Alternatively, a skilled technician may be sent out to perform an "on premises" re-calibration of the OSA. An extended period of time may elapse between these on-premises re-calibration visits, where the user cannot assess any compromise in the performance of the OSA. Given the precision required of these systems, maintaining sufficient wavelength calibration in the field is a challenge.

SUMMARY OF THE INVENTION

The present invention addresses the problems remaining in art and relates to an on-premises calibrator system that is configured to provide individual wavelength calibration over the full spectrum of interest.

In accordance with the principles of the present invention, an on-premises, fully functional calibrator is proposed that maintains real-time wavelength stability of an optical measurement instrument (such as an OSA), minimizing down time when compared to an extensive and expensive re-calibration process that may include taking the equipment out of service and sending it away to be calibrated.

In one embodiment, the on-premises calibrator takes the form of an apparatus comprising: a fixed wavelength source, a tunable wavelength source, an optical switch controlling which wavelength source provides the output, a variable optical attenuator coupled to the output of the optical switch for controlling a power level of a calibration beam provided as an output, and an internal controller used to generate the control signals for the various components in response to received external commands, typically via from an external GUI of the user's computer system.

Other and further aspects and embodiments of the present invention will become apparent during the course of the following discussion and by reference to the accompanying drawings.

BRIEF DESCRIPTION OF THE DRAWINGS

Referring now to the drawings, where like numerals present like parts in several views.

DETAILED DESCRIPTION

As mentioned above, the present invention relates to a fully functional calibrator for use at instrument's location (i.e., an "on-premises calibrator") that maintains real time wavelength stability. The turn-key nature of the inventive calibrator is such that it may be utilized on a regular basis (e.g., daily, weekly, etc.) to maintain wavelength stability and avoid the need to perform a lengthy (and expensive) out-of-service complete re-calibration. In many situations, a complete re-calibration also requires for the instrument to be shipped to a third party organization that performs this type of service. Thus, the ability to perform an on-site re-calibration on a regular basis in accordance with the principles of the present invention eliminates this disruption to everyday business. Moreover, by using the inventive calibrator on a relatively frequent basis, the precision and accuracy of the OSA measurements are very well controlled.

Figure 1:
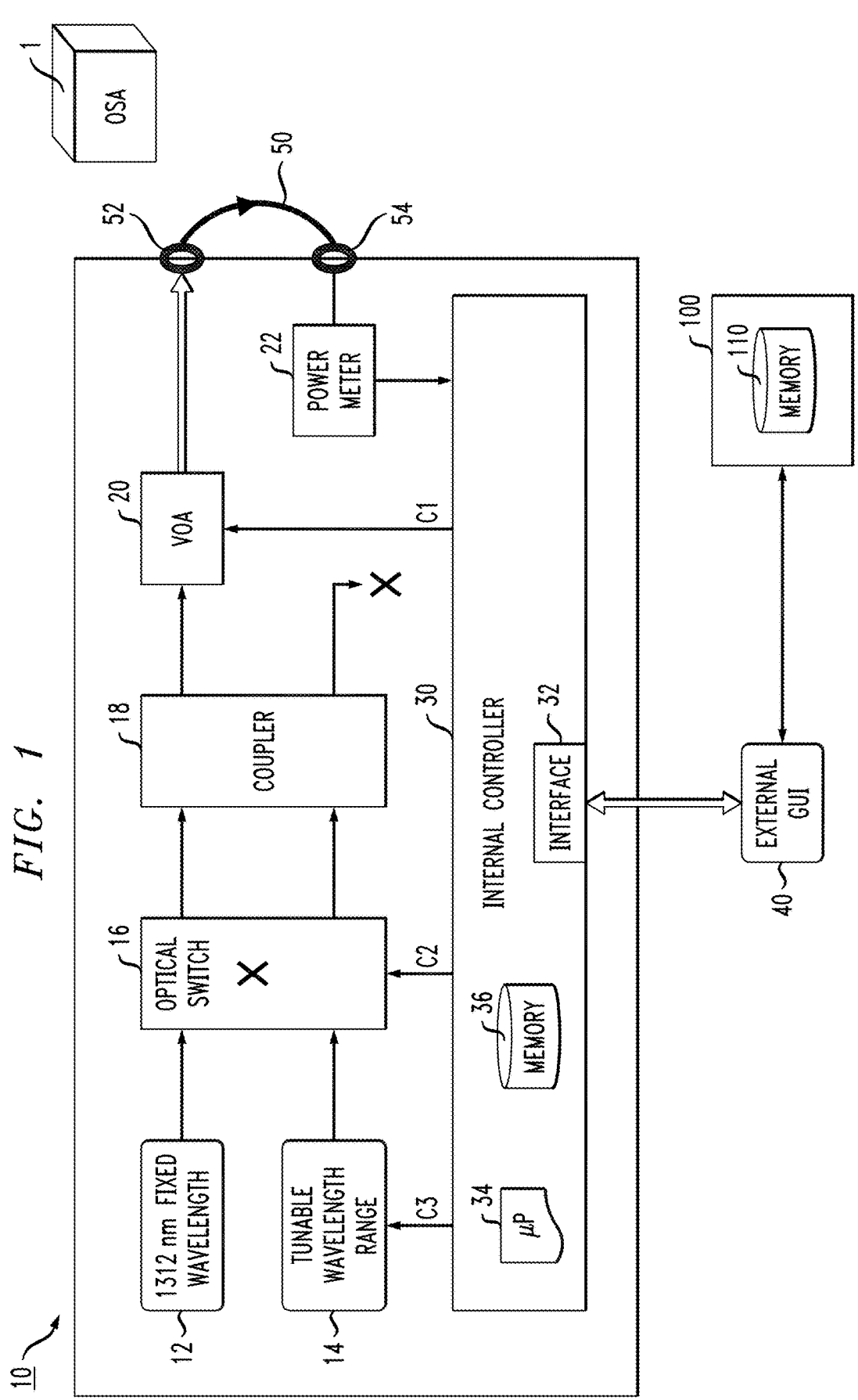
FIG. 1 is a block diagram of an exemplary on-premises calibrator for providing optical wavelength calibration in accordance with the principles of the present invention.

FIG. 1 illustrates an exemplary on-premises optical wavelength calibrator 10 formed in accordance with the principles of the present invention that may be co-located on premises with the various instruments that require calibration, where the on-premises calibrator is particularly configured to allow for the user of the instrument to perform the calibration his/herself. On-premises calibrator 10 is shown as comprising a fixed (reference) wavelength laser diode source 12, as well as a tunable wavelength source 14. Fixed wavelength source 12 preferably comprises a distributed feedback (DFB) laser, and in this embodiment is fabricated to operate at a wavelength of 1312 nm. In this embodiment of the present invention, tunable wavelength source 14 comprises a tunable DFB laser that operates over a wavelength range similar to that of the instrument being calibrated (such as, for example, OSA 1 as shown in FIG. 1). In one example, tunable wavelength source 14 may comprise a C-band tunable wavelength source, which is capable of providing an optical output beam over the wavelength range of 1530 nm to 1565 nm. Advantageously, tunable wavelength source 14 is configured to be able to accurately "lock" on a set of individual wavelengths that will be used during a calibration process and thus provide a calibration across the complete bandwidth of the associated OSA.

An optical switch 16 is included in on-premises calibrator 10 and used to control which wavelength source (i.e., fixed wavelength source 12 or tunable wavelength source 14) is provided as the output "test wavelength" from on-premises calibrator 10. In one embodiment, optical switch 16 may comprise MEMs devices. The selected output from optical switch 16 subsequently passes through an optical coupler 18, which directs the selected output to a variable optical attenuator (VOA) 20. Also included in on-premises calibrator 10 is a power meter 22, used to measure incoming optical power.

A controller 30 is included within on-premises calibrator 10 and used to transmit commands to the various elements identified above in order to perform a given calibration sequence. In particular, internal controller 30 includes an interface 32 for communicating with an external computing system 100 via an external GUI 40. Internal controller 30 also includes a processor 34 and memory 36 that function collectively to implement the process steps utilized to perform field calibration in accordance with the principles of the present invention.

When using on-premises optical wavelength calibrator 10, a first step is to perform an analysis of a reference optical cable 50 that will be used to couple on-premises calibrator 10 to a specific "instrument under test" (shown here as OSA 1). That is, in order to ensure an accurate calibration process, it is important to measure the optical attenuation (power loss) along the cable providing the test inputs to OSA 1. Thus, when initiating a field calibration process, GUI 40 instructs the user to first connect reference cable 50 between output port 52 and input port 54 of on-premises calibrator 10. Input port 54 is shown as coupled to power meter 22, where the output from power meter 22 is delivered to internal controller 30, with the measured power subsequently displayed on GUI 40 for the user.

Once on-premises calibrator 10 "knows" that cable 50 is positioned as shown in FIG. 1 (which may be recognized via internal controller 30, or supplied as a prompt from the user via GUI 40 (i.e., "cable connected to power meter"), internal controller 30 transmits a command along signal line C1 to VOA 20 to initiate to cable measurement process. In particular, VOA 20 is instructed to be set at its maximum attenuation level (i.e., greatest amount of signal loss). A command is then sent along signal line C2 from internal controller 30 to switch 16, setting the state of switch 16 so that tunable source 14 is blocked and only the reference, fixed wavelength output from fixed source 12 passes through the combination of switch 16 and coupler 18 into VOA 20. At this maximum attenuation setting for VOA 20, a low power beam at 1312 nm is provided as an output at port 52 of on-premises calibrator 10.

The reference beam operating at 1312 nm then propagates along cable 50 and re-enters on-premises calibrator 10 at input port 54. The received power associated with this maximum attenuation setting of VOA 20 is measured in power meter 22 and stored in a memory element 36 of internal controller 30 for use in performing the following calibration process steps. Memory element 36 may also store a known reference power level (for example, −20 dBm) that is desired to be used for the following process of calibrating OSA 1. Internal controller 30 then instructs VOA 20 to slowly decrease its attenuation level (i.e., increase the signal power) as the reference beam from source 12 continues to pass through the apparatus, with power meter 22 measuring an increase in received power as a function of the decrease in attenuation level. Once the measured power level matches the stored reference power level, VOA 20 is instructed to "fix" its attenuation at that associated level. As will be discussed below, there are specific situations where the power level is adjusted during the course of the calibration. In those situations, a specific control input is used to modify the power level of VOA 20 as necessary.

Figure 2:
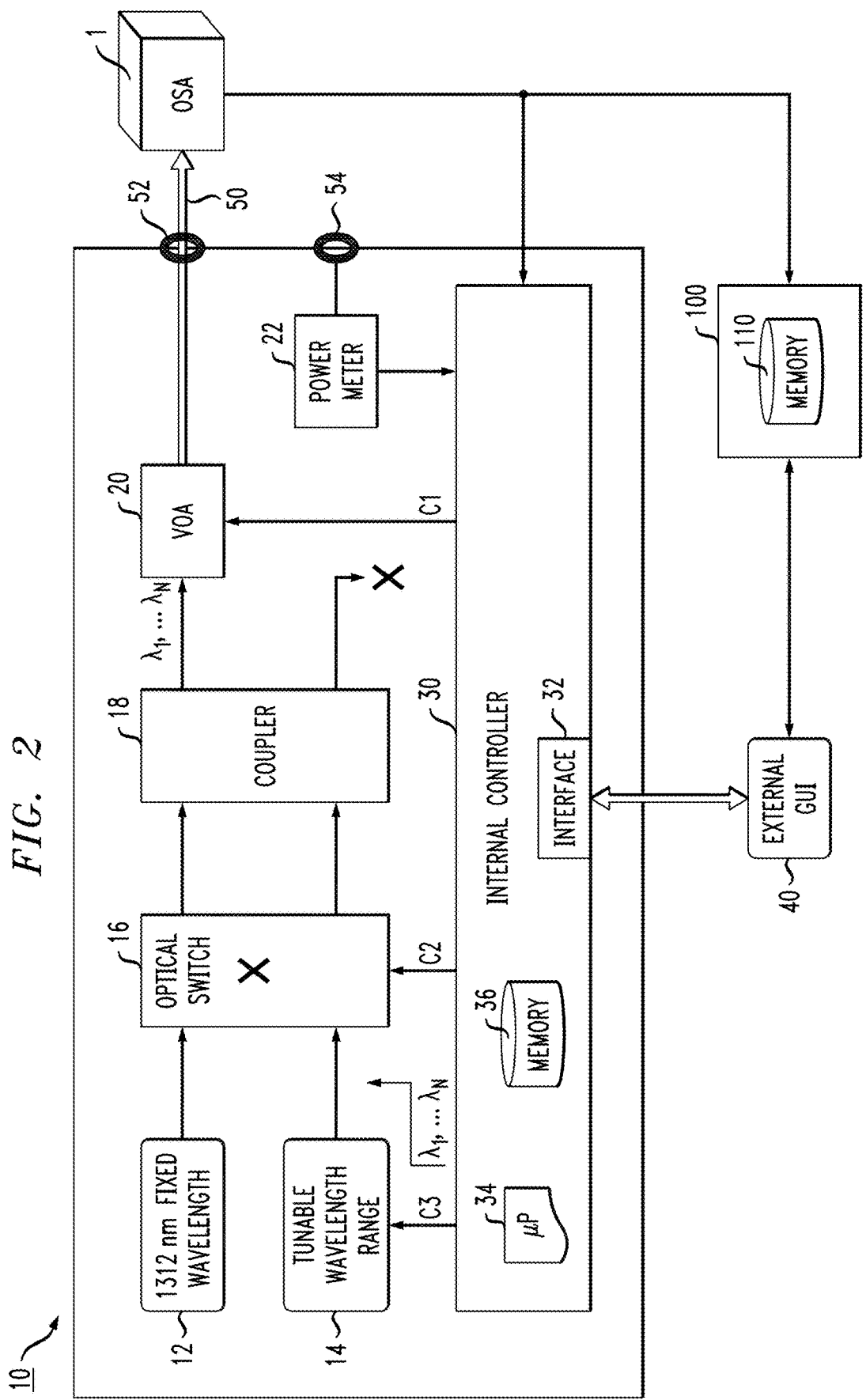
FIG. 2 shows the inventive on-premises optical wavelength calibrator of FIG. 1, as attached to a particular instrument to be calibrated (here, an optical spectrum analyzer (OSA))

Continuing with the description of on-premises optical wavelength calibrator 10 as shown in FIG. 1, once the VOA attenuation level fixed, the process of analyzing cable 50 has been completed, and the actual calibration of OSA 1 may commence. At this point, GUI 40 instructs the user to now connect reference cable 50 between output port 52 of on-premises calibrator 10 and an input port of OSA 1, as shown in the configuration of FIG. 2. Once this connection is secure (perhaps recognized by internal controller 30 as a condition where cable 50 is attached to an OSA, or via a prompt from the user—entered through GUI 40 (for example), internal controller 30 sends a command via signal line C2 to change the state of optical switch 16, now directing the output from tunable source 14 through switch 16 and coupler 18. The wavelength tunable output from source 14 is thereafter directed through VOA 20 (with its fixed attenuation) to form an output calibration beam that exits on-premises calibrator 10 at output port 52 and is applied as a calibration test beam input to OSA 1. The calibration beam is operating at a known, precise wavelength and the measured value created by OSA 1 can be used to provide whatever adjustment is necessary within OSA 1 to bring the measured value in line with the known value of calibration beam. The measured wavelength generated within OSA 1 may be sent as an output signal along a return (electrical) cable 56 coupled between OSA 1 and internal controller 30 (and perhaps also to external computer system 100). Either one or both of memory elements 36 and 110 may store the wavelength values as measured by OSA 1, creating a performance record for that particular instrument.

Internal controller 30 continues to control the calibration process by sending commands to tunable source 14 via a signal line C3 to step the output wavelength of the calibration beam produced by tunable source 14. A specific set of wavelengths $\lambda_1, \lambda_2, \ldots, \lambda_N$ within the tuning range of source 14 is generally used, where as mentioned above, tunable source 14 is configured to generate "locked" wavelengths that are stable to a value of five or six significant digits. The wavelength value as measured by OSA 1 continues to be compared to the known values, with adjustments made to OSA 1, similar to a conventional re-calibration procedure, until all test wavelengths have been used.

Figure 3:
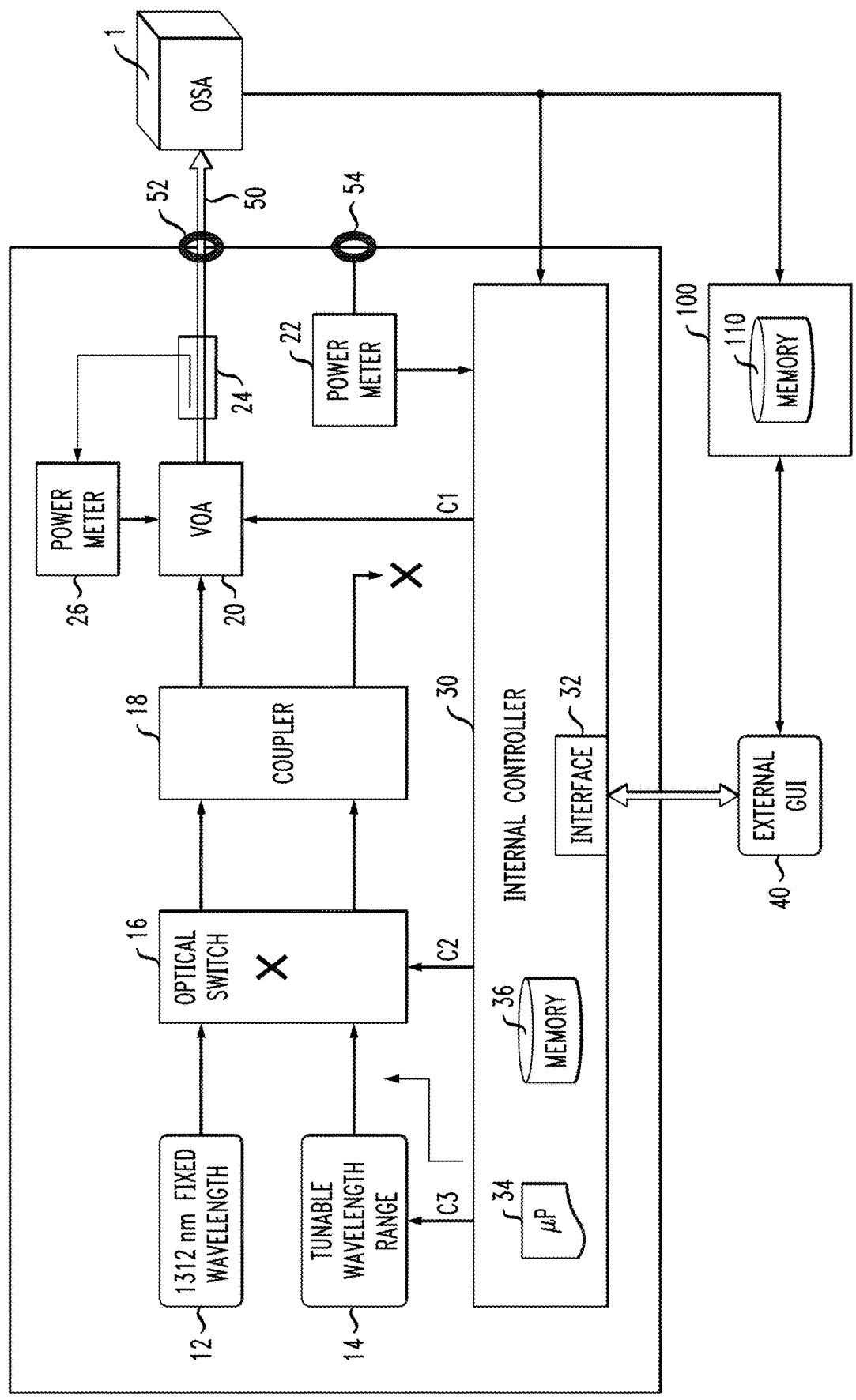
FIG. 3 illustrates an alternative embodiment of the present invention, in this case an on-premises calibrator that allows for the output power of a calibration beam (at a defined wavelength) to be adjusted by the personnel performing the calibration.

As mentioned above, it is desirable in some cases to provide adjustments to the attenuation level of VOA 20 as a function of the wavelength of the beam passing through. For example, it may be desirable to maintain a constant power level of the calibration beam exiting at output port 52 of on-premises calibrator 10, regardless of the wavelength of the test beam itself. FIG. 3 illustrates an embodiment of the present invention that includes a feedback path for maintaining a constant output power.

In particular, FIG. 3 illustrates an alternative on-premises optical wavelength calibrator 10A including an optical tap 24 positioned beyond the output of VOA 20. The out-coupled portion of the calibration beam is subsequently applied as an input to a power meter 26 included in calibrator 10A. The measured power is compared to a defined reference value, with a feedback output from power meter 26 applied to VOA 20 to adjust its attenuation level (as need be) to maintain the desired reference power value.

Figure 4:
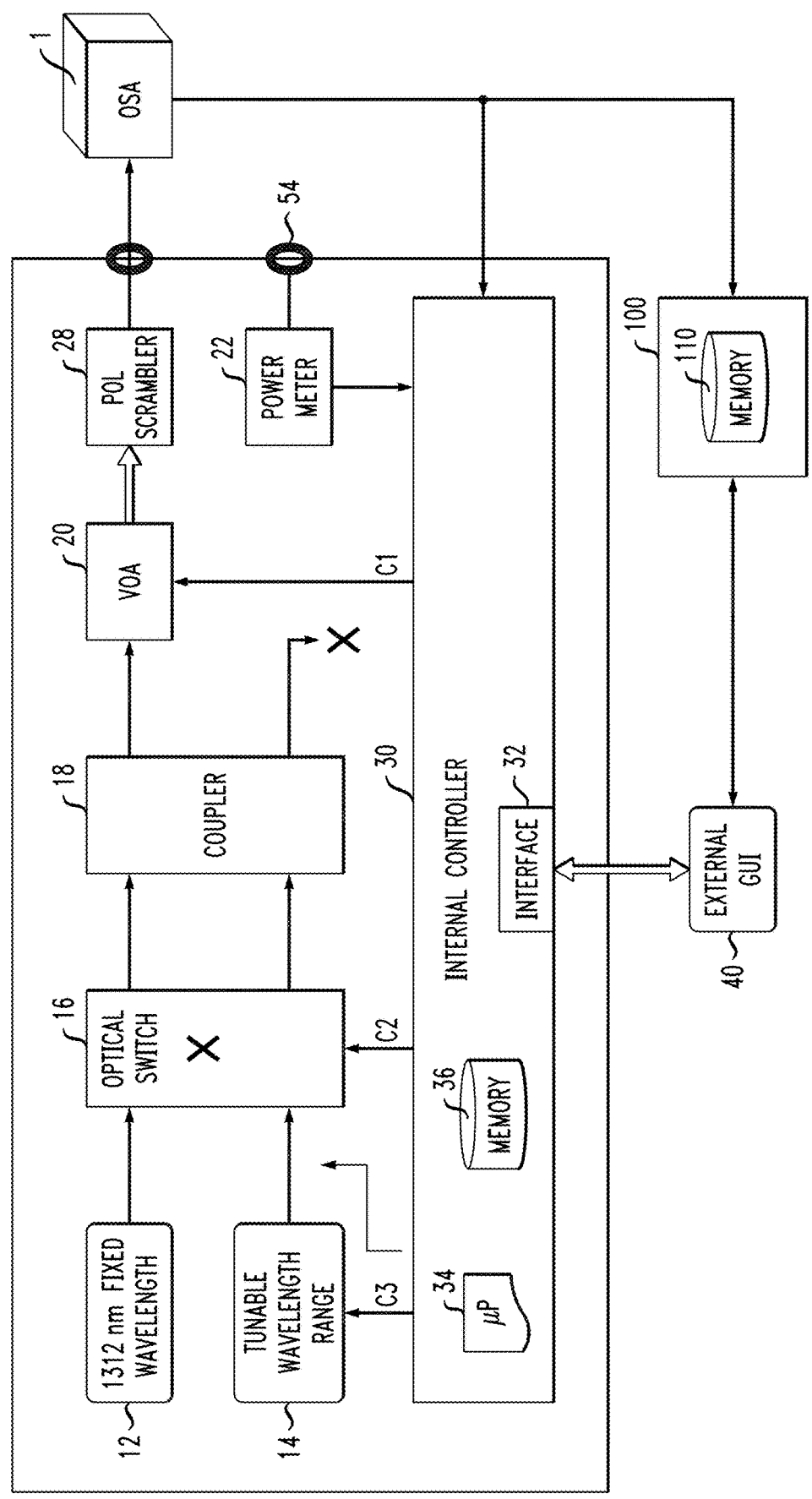
FIG. 4 shows yet another embodiment of the present invention, in this case also introducing polarization scrambling to the output calibration signals generated by the on-premises calibrator.

FIG. 4 illustrates yet another embodiment of the present invention, shown here as on-premises optical wavelength calibrator 10B. In this embodiment, a polarization scrambler 28 is disposed along the output path from VOA 20 and used to randomly change the polarization state of the calibration beam during the measurement/calibration process. By providing this random change in polarization, polarization-dependent variations in measured power will be averaged out, improving the accuracy of the inventive on-premises optical wavelength calibrator.

Figure 5:
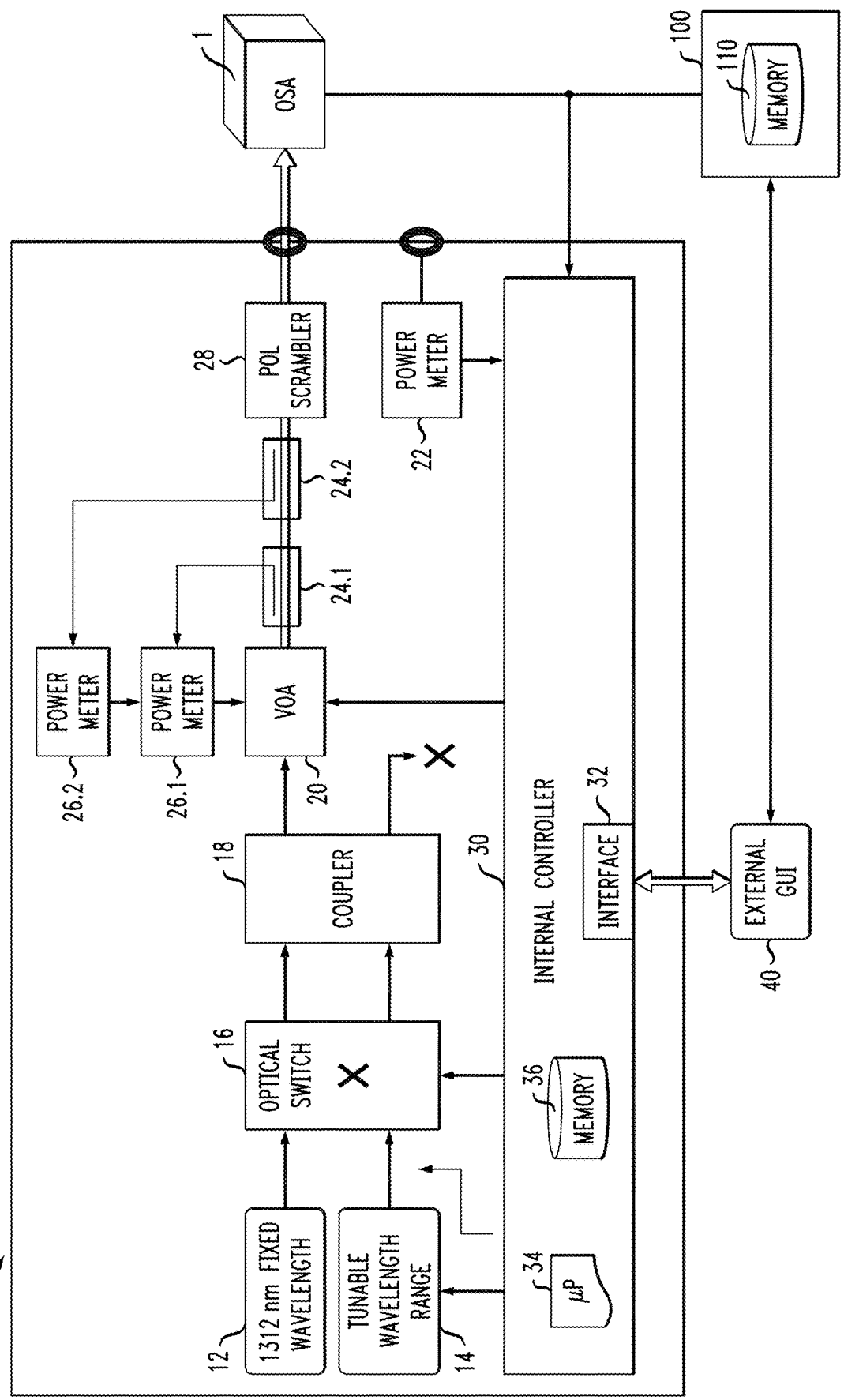
FIG. 5 illustrates a further embodiment of the present invention that incorporates both the power control aspect of the embodiment of FIG. 3 with the polarization insensitivity aspect of the embodiment of FIG. 4.

It is further possible to utilize polarization scrambler 28 in combination with a pair of optical taps 24.1, 24.2 and a pair of power meters 26.1, 26.2, as shown in FIG. 5 (identified as on-premises calibrator 10C). As shown, tap 24.1 is positioned at the output of VOA 20 and used to direct a portion of the output test beam into associated power meter 26.1. Tap 24.2 is positioned to receive any light that is reflected by output port 52 (as well as by polarization scrambler 28), directing the reflected light into power meter 26.2. This arrangement may be used to calculate/measure the optical power reflected back into on-premises calibrator 10C.

In summary, the present invention discloses an on-premises optical wavelength calibrator that is fully functional and able to provide frequent (e.g., daily, weekly, etc.) re-calibration of a device such as an OSA without need to take the device out of service for an extended period of time the use of an external GUI allows for regular documentation/records to be maintained regarding the calibration process so as to maintain a full maintenance history of each instrument.

While this disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essentials cope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. An on-premises optical wavelength calibrator, comprising:
   a fixed wavelength source;
   a tunable wavelength source, the generated wavelength provided via a first control signal applied thereto;
   an optical switch responsive to the fixed wavelength source and the tunable wavelength source, providing either source as an output as commanded by a second control signal applied thereto;
   a variable optical attenuator coupled to the output of the optical switch for controlling a power level of a calibration beam provided as an output, the power level provided by a third control signal applied thereto;
   a first power meter for measuring a return optical power level; and
   an internal controller used to generate the first, second, and third control signals in response to received external commands.

2. The on-premises optical wavelength calibrator as defined in claim 1, further comprising an optical coupler disposed between the output of the optical switch and the input to the variable optical attenuator.

3. The on-premises optical wavelength calibrator as defined in claim 1, wherein the internal controller includes an interface to an external GUI, the external GUI used to provide the external commands to the internal controller.

4. The on-premises optical wavelength calibrator as defined in claim 1, the calibrator further comprising
   a first optical tap disposed along the output path from the variable optical attenuator for redirecting a portion of calibration beam out of the signal path; and
   a second power meter responsive to the portion of calibration beam provided by the first optical tap, where the power level measured by the second power meter is used to control the attenuation level of the variable optical attenuator.

5. The on-premises optical wavelength calibrator as defined in claim 4, the calibrator further comprising
   a second optical tap disposed along the output path beyond the first optical tap, the second optical tap configured to out-couple reflected signals re-entering the calibrator; and
   a third power meter coupled to the second optical tap, where the power level measured by the third power meter is further used to control the attenuation level of the variable optical attenuator.

6. The on-premises optical wavelength calibrator as defined in claim 1, the calibrator further comprising
   a reflection optical tap disposed along the output path beyond the variable optical attenuator, the reflection optical tap configured to out-couple reflected signals re-entering the calibrator; and
   a reflection power meter coupled to the reflection optical tap, where the power level measured by the reflection power meter is used to control the attenuation level of the variable optical attenuator.

7. The on-premises optical wavelength calibrator as defined in claim 1, the calibrator further comprising
   a polarization scrambler disposed along the output path from the variable optical attenuator for continuously modifying the polarization of the calibration beam in a manner that provides for a polarization insensitive wavelength calibration process.

8. The on-premises optical wavelength calibrator as defined in claim 7, the calibrator further comprising
   an output optical tap disposed along the signal path between the variable optical attenuator and the polarization scrambler for redirecting a portion of calibration beam out of the signal path; and
   a tapped signal power meter responsive to the portion of calibration beam provided by the output tap, where the power level measured by the tapped signal power meter is used to control the attenuation level of the variable optical attenuator.

9. The on-premises optical wavelength calibrator as defined in claim 1 wherein the fixed wavelength source comprises a distributed feedback laser.

10. The on-premises optical wavelength calibrator as defined in claim 1 wherein the tunable wavelength source comprises a C-band tunable wavelength source, providing beams at selected discrete wavelengths between 1530 nm and 1565 nm.

\* \* \* \* \*